United States Patent [19]

Bright

[11] Patent Number: 5,137,232
[45] Date of Patent: Aug. 11, 1992

[54] CANOPY OR PANEL LOCKING ASSEMBLY

[75] Inventor: Frederick A. Bright, Preston, United Kingdom

[73] Assignee: British Aerospace Public Limited Company, London, England

[21] Appl. No.: 642,212

[22] Filed: Jan. 16, 1991

[30] Foreign Application Priority Data

Jan. 16, 1990 [GB] United Kingdom ............... 9000952

[51] Int. Cl.⁵ .............................................. B64C 1/32
[52] U.S. Cl. ................................. 244/121; 244/129.4; 292/201; 292/48; 74/89
[58] Field of Search ......... 244/121, 122 AE, 122 AF, 244/129.1, 129.4, 129.5; 292/201, 44, 45, 48, 25, 52, 196, 200, DIG. 5; 49/279, 280, 300; 74/89, 89.1–89.15

[56] References Cited

U.S. PATENT DOCUMENTS

| | | | |
|---|---|---|---|
| 2,607,551 | 8/1952 | Clark et al. | 244/121 |
| 2,998,212 | 8/1961 | Rogers, Jr. | 244/121 |
| 3,006,583 | 10/1961 | Cowan . | |
| 3,194,517 | 7/1965 | Morris et al. . | |
| 3,751,088 | 8/1973 | Schlage et al. | 292/201 |
| 3,768,759 | 10/1973 | Martin | 244/121 |
| 4,473,201 | 9/1984 | Barnes et al. | 292/48 |

FOREIGN PATENT DOCUMENTS

| | | |
|---|---|---|
| 715078 | 9/1954 | United Kingdom . |
| 871851 | 7/1961 | United Kingdom . |
| 1490651 | 11/1977 | United Kingdom . |
| 2154646 | 9/1985 | United Kingdom . |

*Primary Examiner*—Galen Barefoot
*Attorney, Agent, or Firm*—Young & Thompson

[57] ABSTRACT

A canopy locking system includes a series of locking hooks and bolts interconnected with a common torque tube 30 which is turned to lock or unlock the canopy. The shaft may be turned in routine operation by a motor 36 or, in emergency operation by firing a pair of jacks 37.

11 Claims, 8 Drawing Sheets

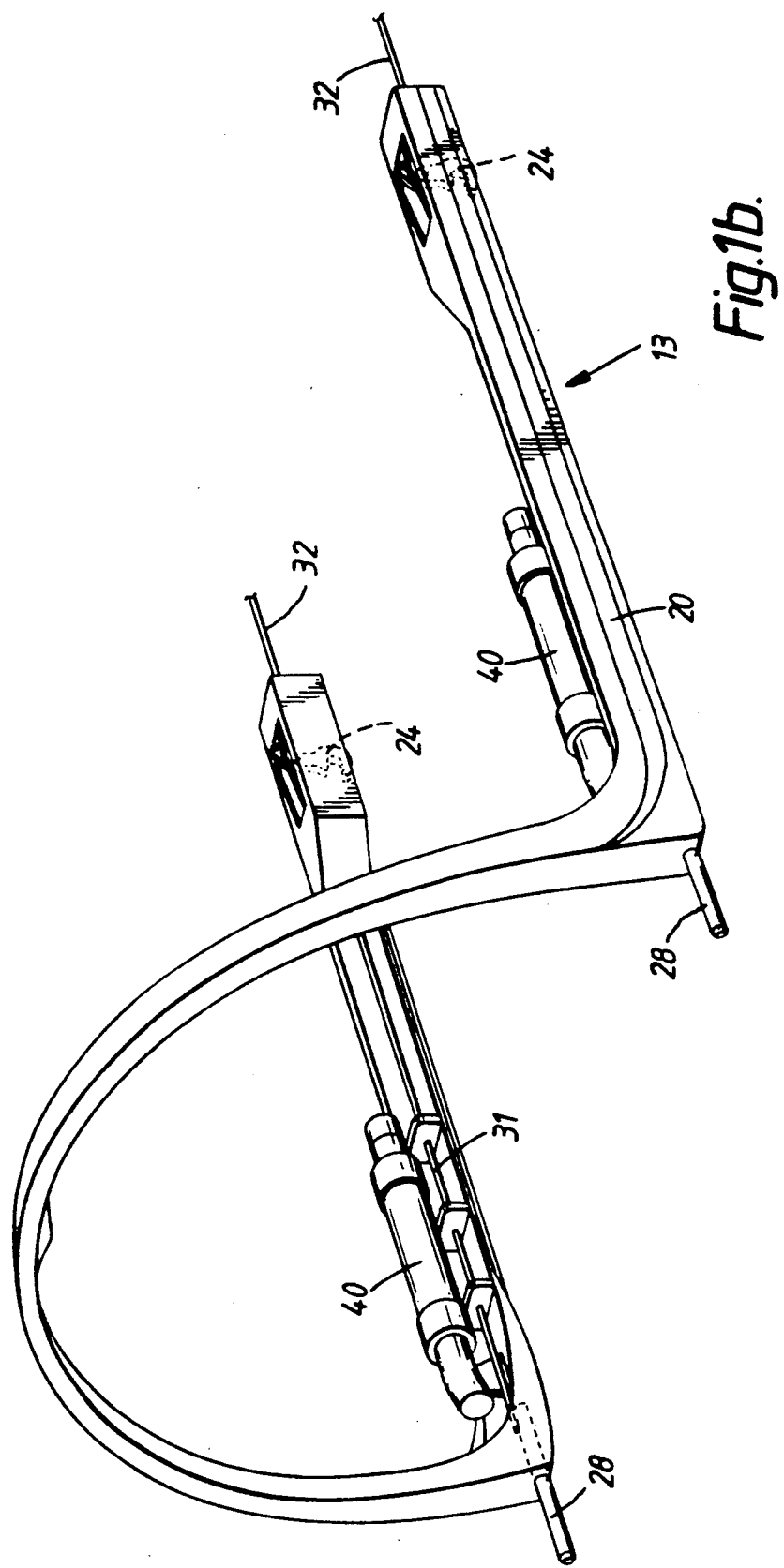

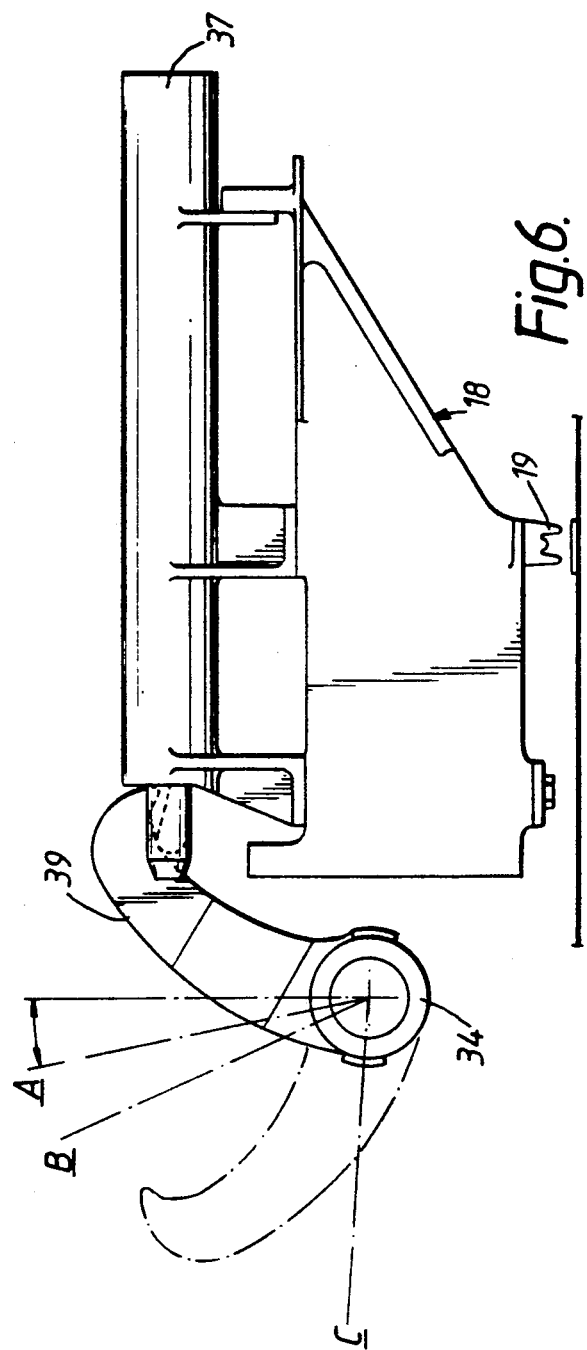
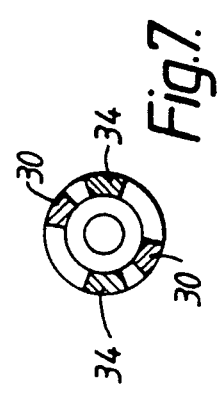

CANOPY OR PANEL LOCKING ASSEMBLY

This invention relates to a canopy or panel locking assembly and to a drive assembly for use therein, and in particular, but not exclusively, to such assemblies for use in locking a cockpit canopy on an aircraft.

In one arrangement, an aircraft cockpit canopy is hinged to the fuselage at its rear end and opened and closed in routine operation by a jack. The canopy should be locked in its closed position so that it can withstand the high differential pressures to which it will be subjected in use due to pressurisation of the cockpit, but the locks should be capable of being released quickly in the event that the canopy is to be ejected in an emergency.

According to one aspect of this invention, there is provided a canopy or panel locking assembly comprising a canopy or panel means, an aperture for being closed by said canopy or panel means, a plurality of locking means at spaced locations for locking the canopy or panel means with respect to said aperture, a drive member connected to said locking means for locking and unlocking thereof, first drive means for applying locking/unlocking drive in routine operation and second drive means for applying unlocking drive in emergency operation.

According to another aspect of this invention there is provided a canopy or panel locking assembly comprising a canopy or panel means, a plurality of locking means at spaced locations for locking the canopy or panel means with respect to the aperture, a shaft member extending between spaced edge regions of said canopy or panel means and being drivably connected to said locking means for locking/unlocking movement thereof, and drive means for driving said shaft member.

According to yet another aspect of this invention there is provided a drive assembly comprising a shaft member, a motor drivably connected to said shaft member for routine rotation thereof and means, including linear actuator means, for effecting emergency rotation thereof.

By way of example only, a specific embodiment of the invention will now be described, reference being made to the accompanying drawings, in which:

FIG. 1b is a schematic perspective view of the forward part of the cockpit canopy of FIG. 1;

FIG. 6 is a section view on lines VI—VI of FIG. 5;

FIG. 7 is a section view on lines VII—VII of FIG. 5;

Figure 1A:
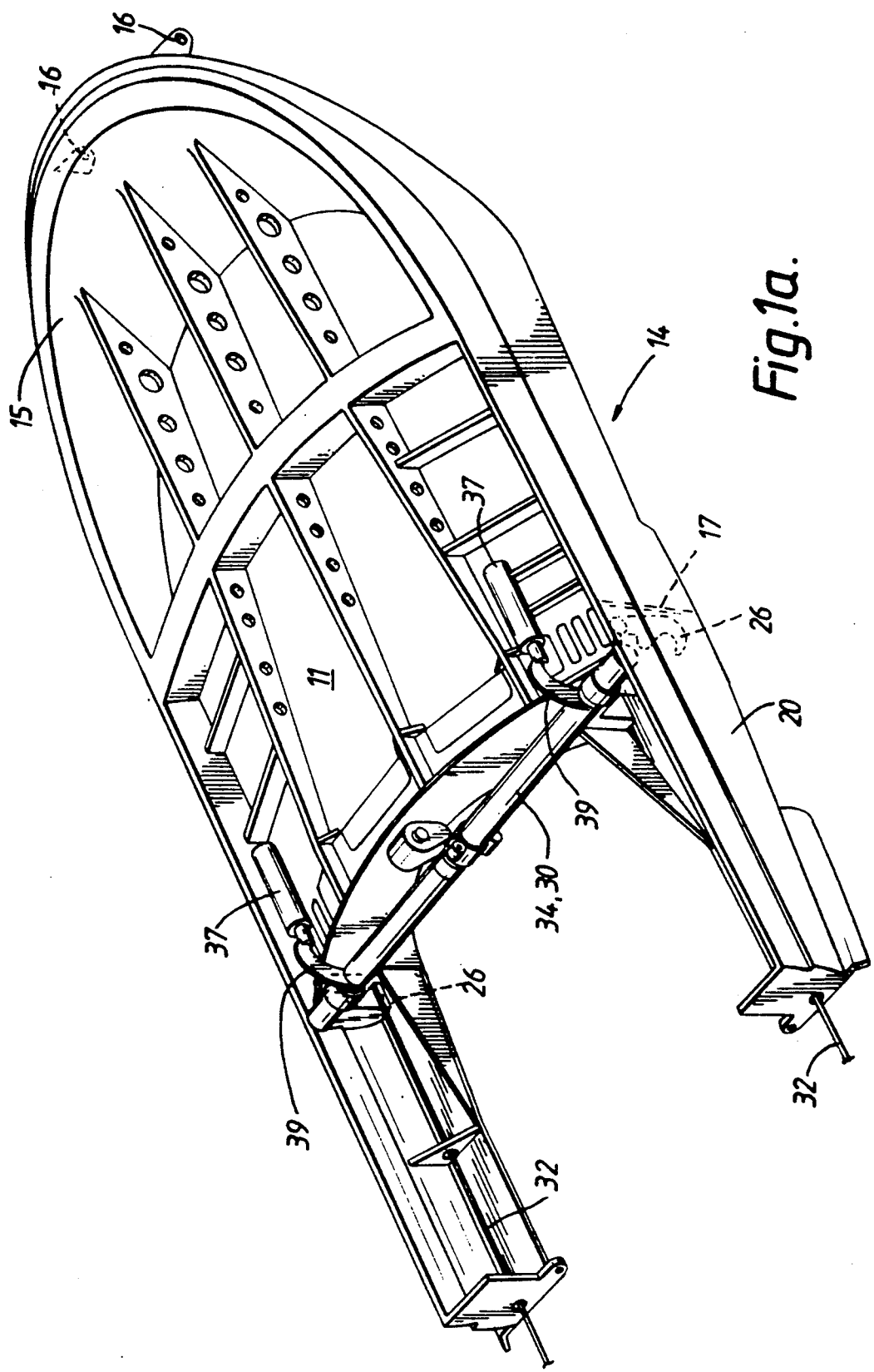
FIG. 1a is a schematic perspective view of the rear part of a cockpit canopy including a canopy locking assembly according to the invention.
Figure 2:
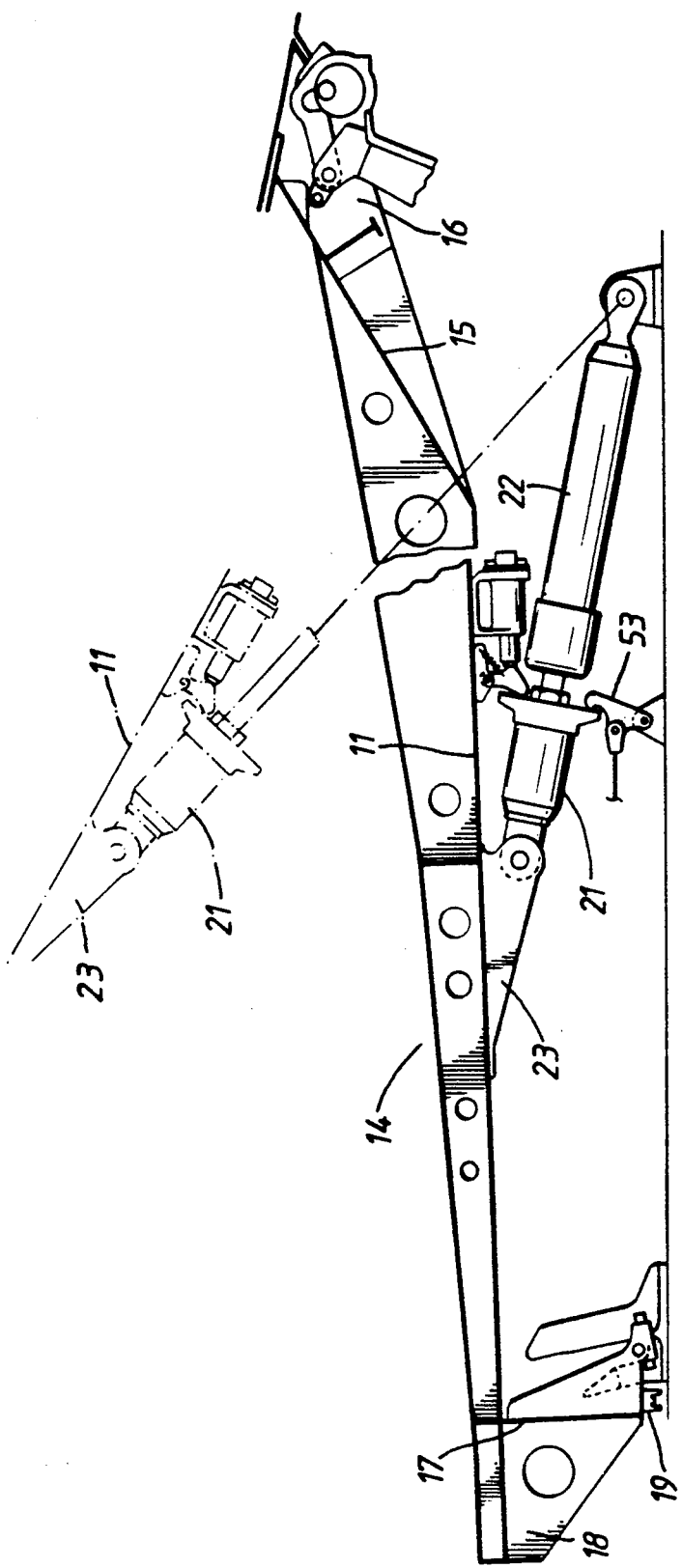
FIG. 2 is a section view through the rear part of the cockpit showing the main jack and sealing arrangements with the front part taken on the centreline of the cockpit and the rear part taken on the right hand hinge.

Referring to FIGS. 1 and 2, the cockpit canopy assembly includes a canopy 10 hinged at its rear end to the fuselage 12. The canopy 10 is formed of a forward casting 13 (FIG. 1b) and a rearward casting 14 (FIG. 1a) an the rearward casting 14 includes two brackets 16 at its rear end which hinge the canopy 10 to the fuselage.

The rear canopy casting 14 includes a floor 11, a curved slanted rear wall 15 and a pressure bulkhead 17. As can be seen from FIG. 2, these three parts form a pressure barrier between the pressurised cockpit canopy and the equipment bay beneath the floor 11. For this purpose the lower edge of the pressure bulkhead is provided with a pressure seal strip 19.

The front canopy casting 13 is connected at its aft end to the rearward canopy casting and together they support the canopy glass.

The canopy includes a locking system for locking it when closed. The locking system comprises a forward and a rearward pair of pivotable hooks 24, 26 respectively and a pair of shoot bolts 28 which are movably attached to the canopy frame 20 and cooperate with complementary parts attached to the fuselage 12. The various hooks and bolts are driven in unison via a transverse torque tube 30 spaced forwardly of a cross-member 18 integral with the rearward casting, and a series of interconnecting links 31 to 33. The torque tube 30 is surrounded by a concentric ejection sleeve 34 and is drivably connected by a one-way clutch arrangement to be described later.

The torque tube 30 can be rotated to unlock the hooks and bolts by two methods: for routine operation an electric motor and gearbox assembly 36 drives the torque tube 30; for operation in an emergency or power failure, the ejection sleeve 34 may be rotated in the appropriate sense to rotate the torque tube. The ejection sleeve may be driven by a pair of unlocking jacks 37 (when the canopy is to be ejected) or manually by pulling an external unlock handle 38 (FIG. 3) which is connected to a bracket 41 on the ejection sleeve by a suitable system e.g. cables and levers.

Raising and lowering of the cockpit canopy is effected by a hydraulic main jack 22 which is coupled between the fuselage and a bracket 23 on the underside of the floor 11. For ejection purposes, a quick release coupling 21 is provided between the bracket 23 and the main jack 22.

An ejection rocket 40 is attached to each side of the canopy. The firing of the rocket 40, the unlocking of the jacks 37, and also the release of the quick release coupling 21 between the main jack 22 and the rear canopy casting 14 are all controlled so that they occur in the correct sequence when the cockpit is to be ejected in an emergency.

Referring to FIGS. 5 to 11, the torque tube 30 is rotatably mounted by means of two brackets 42, one fixed to each end of the cross-member 18, and the motor and gearbox assembly 36 are attached to the mid region of the cross-member 18. Each end of the torque tube is provided with an end fitting or lever fitting 44 which provides arms for connection to the links 31 and 32. The inboard end 45 of each fitting is castellated to co-operate with the adjacent castellated end of the torque tube 30, as shown in FIG. 7, so that during routine rotation of the torque tube 30 no drive is imparted to the ejection sleeve 34, but when the ejection sleeve is rotated, the castellations on the sleeve 34 engage the corresponding parts on the lever fitting after a set amount of "float".

FIG. 6 shows one of the unlocking jacks 37 in detail; the plunger of the jack co-operates with a scythe-shaped arm 39 attached to the ejection sleeve 34.

Figure 8:
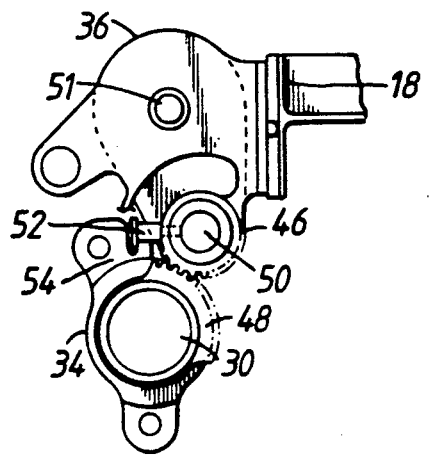
FIG. 8 is a section view on lines VIII—VIII of FIG. 5.

Referring to FIG. 8, the motor and gearbox assembly 36 has an output shaft 50 to which is attached an output pinion 46 with teeth part-way around its periphery which engages a similar, but larger pinion 48 attached to the torque tube 30. The output shaft 50 lies parallel to an intermediate shaft 51 and is internally connected to it via an idler gear (not shown) so that the output and intermediate shafts 50 and 51 rotate in the same sense and through the same angle, which in this embodiment is about 160°. As discussed below, there is limited float between the output and intermediate shafts 50 and 51.

The output pinion 46 is usually fixed against rotation with respect to the output shaft 50 of the gearbox by a radial pin 52 extending through the sleeve of the pinion into the shaft. When the various hooks and bolts are locked, the torque tube 30 is in the position shown in FIG. 8, with the head of the pin received in a fork 54 of a bracket integral with the ejection sleeve 34. If the ejection sleeve is rotated anti-clockwise from the position shown in FIG. 8, the pin 52 will be withdrawn at least from the output shaft 50, so that the output pinion 46 is free to rotate relative to the output shaft 50. The arrangement thus functions as a clutch which disengages the output pinion 46 when the ejection sleeve 34 is rotated.

Figure 9:
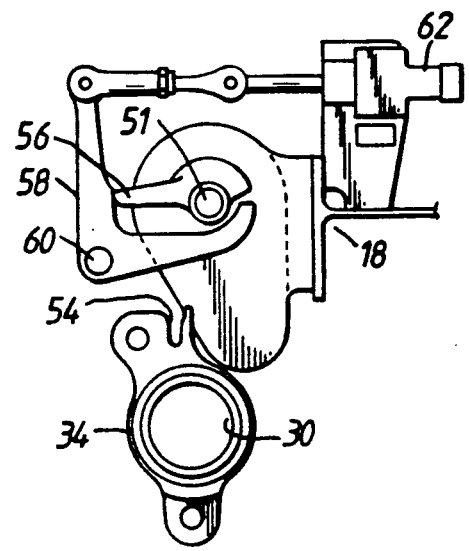
FIG. 9 is a section view on lines IX—IX of FIG. 5.

As seen in FIG. 9, the free end of the intermediate shaft 51 carries a valve operating cam 56 which co-operates with a cranked lever 58 rotatably mounted on a shaft 60 to operate a canopy seal pressure release unit 62.

Figure 10:
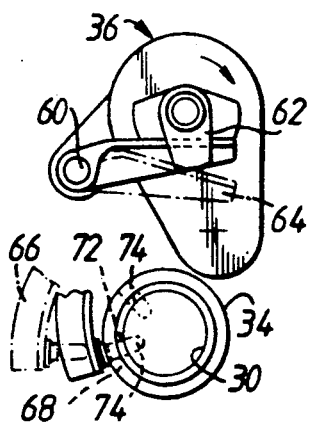
FIG. 10 is a section view on lines X—X of FIG. 5.
Figure 11:
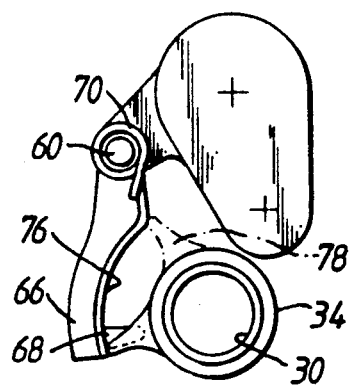
FIG. 11 is a section view on lines XI—XI of FIG. 5.

As seen in FIG. 10, inboard of the valve operating cam 56, the intermediate shaft carries a lock release cam 62 which cooperates with an arm 64 secured to the shaft 60. The other end of the shaft 60 (see FIG. 11) is secured to a locking arm 66 which carries at its end a locking spigot 68. The locking arm 66 is biassed by a spring 70 towards a position in which the spigot extends through a slot 72 in the ejection sleeve 34 to be received in one of a pair of bores 74 in the torque tube 30. This arrangement provides positive retention of the torque tube 30 in its locked and unlocked positions. The locking arm 66 also includes a camming surface 76 which cooperates with a spur 78 which extends from the ejection sleeve 30.

In normal operation, locking and unlocking is done using the motor 36. Viewed from the left-hand side when the assembly is locked, (i.e. as viewed in FIGS. 4 to 9), when the motor is driven in the unlocking sense, the output and intermediate shafts 50 and 51 rotate clockwise. The gearbox incorporates lost motion between the motor 36 and the output pinion 46, so that the intermediate shaft 51 rotates to cause the spigot 68 to be lifted from the bore 74, before the output pinion 46 begins to turn. Further rotation of the motor 36 drives the torque tube 30 anticlockwise and unlocks the various hooks and bolts, and releases the canopy seal pressure release unit 62. As it reaches the end of the unlocking movement the cam 62 allows the spigot 68 to return into the other bore 74 of the torque tube 30. Locking reverses the above sequence.

For an emergency ejection from a locked configuration the unlocking jacks 37 are fired, throwing the scythe-shaped arms 39 anticlockwise as viewed in FIG. 6 and rotating the ejection sleeve in the same sense. During the initial phase of movement 'A' of the ejection sleeve 34 (see FIG. 6) the end fittings 44 remain stationary and the spur 78 causes the arm 66 to withdraw the spigot from the torque tube 30, and the fork 54 begins to withdraw the pin 52 from the output shaft 50, thus uncoupling the output pinion 46 to allow it to rotate with respect to the output shaft. Uncoupling is complete at 'B'. Thereafter, the ends of the ejection sleeve engage the end fittings 44 and rotate them to unlock the various hooks and bolts. Ejection unlocking is complete at 'C'.

At about the same time as the unlocking jacks 37 are fired, the ejection rockets 40 and the quick release mechanism 21 associated with the jack are actuated so that the canopy can be thrust into the airstream. The hinge pins pivotting the arrangement brackets 16 to the fuselage shear to jettison the canopy.

Figure 3:
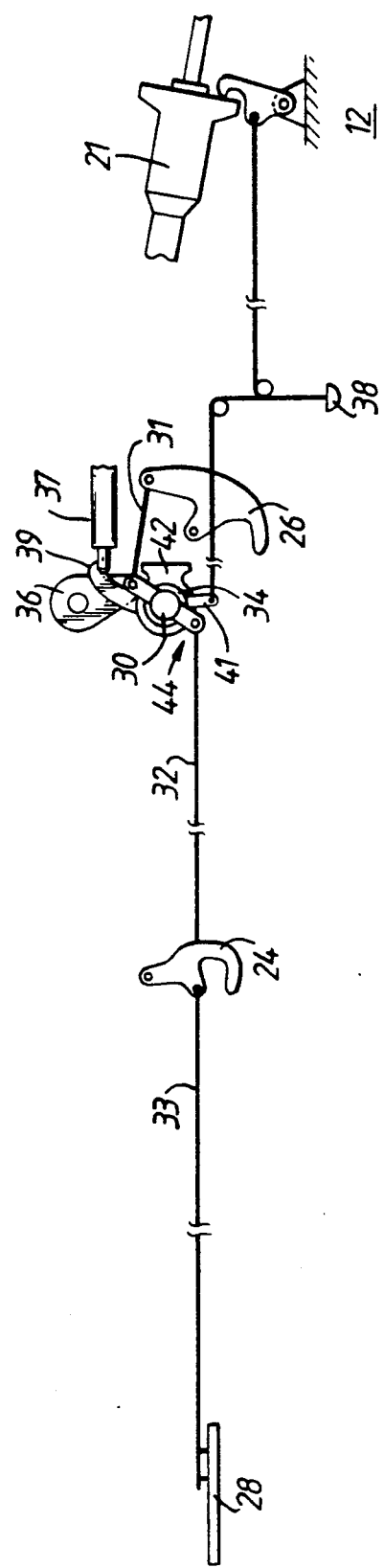
FIG. 3 is a schematic view illustrating the locking and unlocking systems.
Figure 4:
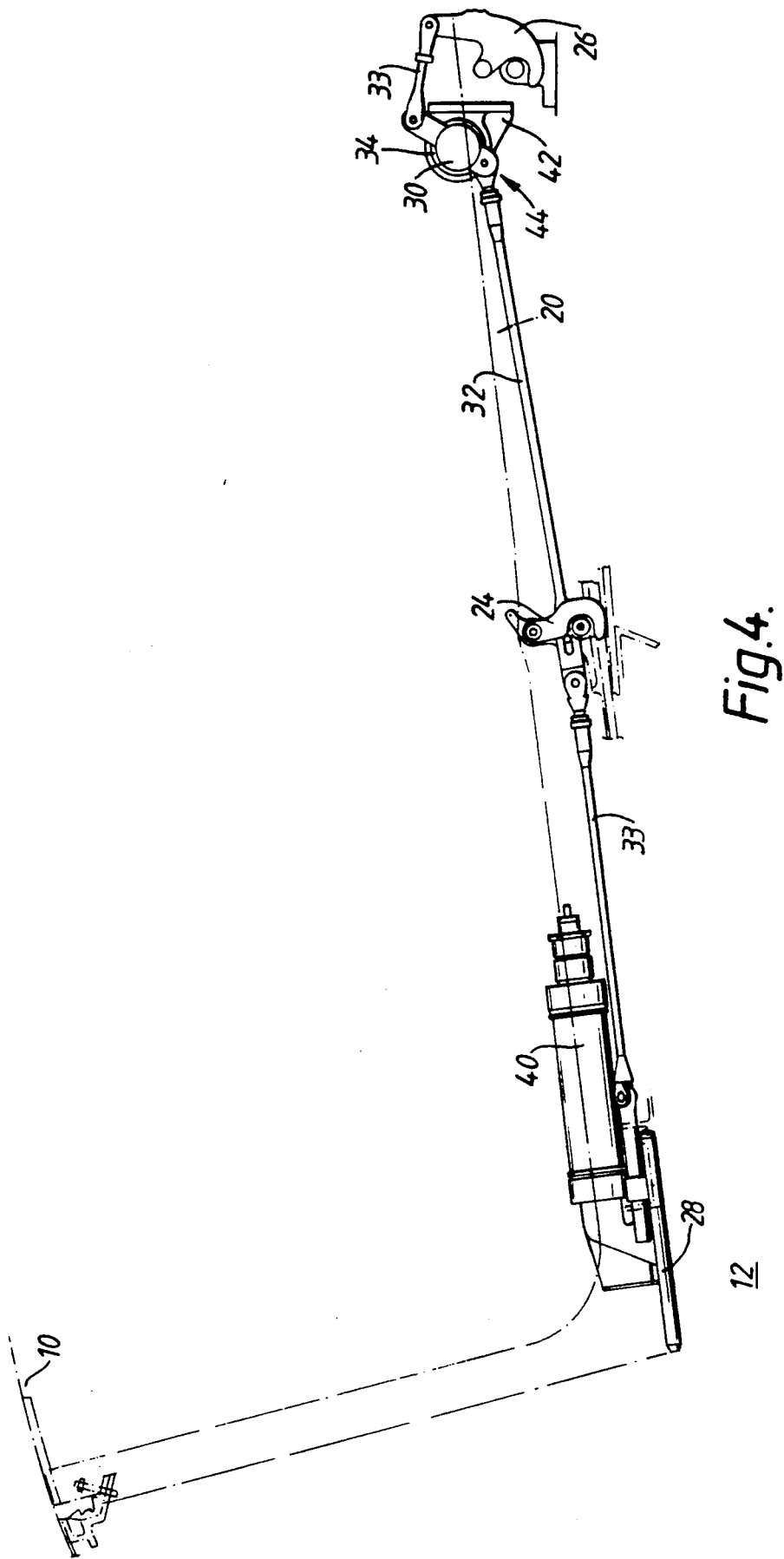
FIG. 4 is a detailed side view on the left-hand side of the locking assembly of the cockpit of FIG. 1.
Figure 5:
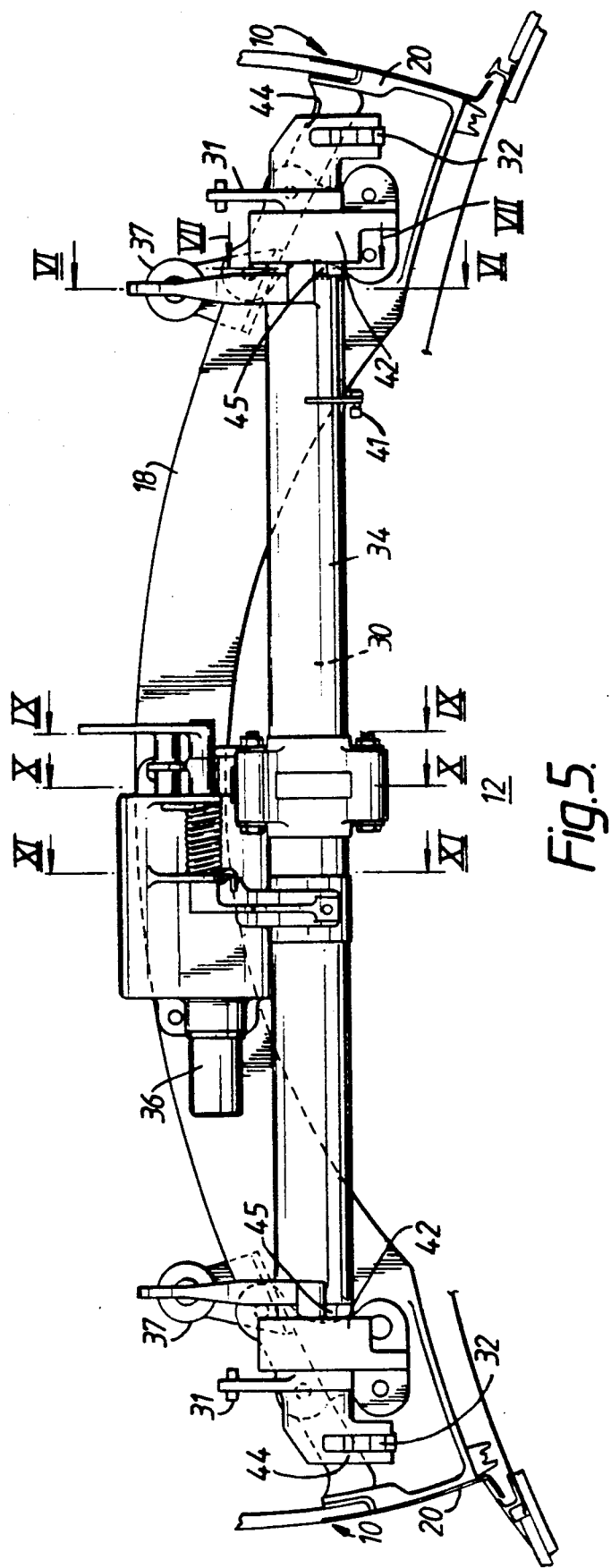
FIG. 5 is a view looking aft on the torque shaft of the assembly of FIGS. 1 to 4.

The canopy may also be unlocked manually by pulling the external unlocking handle 38. This rotates the ejection sleeve 34 and the unlocking sequence is as when the unlocking jacks are fired. As seen in FIGS. 2 and 3, pulling the external unlocking handle 38 also pivots a lever 53 which releases the quick release coupling 21, thus uncoupling the main jack 22 from the canopy.

Further details of the canopy structure described herein are included in our co-pending U.S. applications Ser. Nos. 07/642211 and 07/642213, filed on the same date and assigned to the same assignees.

The invention also extends to any inventive combination of features defined or disclosed herein.

I claim:

1. A canopy or panel locking assembly, comprising:
 a canopy or panel means,
 an aperture for being closed by said canopy or panel means,
 a plurality of locking means at spaced locations for locking the canopy panel means with respect to said aperture;
 a drive mechanism connected to said locking means for locking and unlocking thereof, said drive mechanism including a sleeve member, a shaft member disposed within said sleeve member and a coupling arrangement interconnecting said sleeve member and said shaft member,
 first drive means for applying locking and unlocking drive in routine operation to one of said shaft member and said sleeve member, and
 second drive means for applying unlocking drive to the other of said shaft member and said sleeve member in emergency operation.

2. A canopy or panel locking assembly according to claim 1, wherein said shaft member and said sleeve member extend between opposed edge regions of said canopy or panel means.

3. A canopy or panel locking assembly according to claim 1, wherein said first drive means comprises a motor and said second drive means comprises a linear actuator.

4. A canopy or panel locking assembly according to claim 1, wherein said coupling arrangement provides lost motion whereby during routine operation said shaft member may rotate relative to said sleeve member but during emergency operation rotation of said sleeve member is transmitted to said shaft member.

5. A canopy or panel locking assembly according to claim 1, including locking means for locking movement of said shaft member, wherein said sleeve member includes means for unlocking said locking means and means for releasing the drive between said first drive means and said shaft member.

6. A canopy or panel locking assembly according to claim 1, which includes ejection means for ejecting said canopy or panel means, wherein means are provided for causing common actuation of said ejection means and said second drive means.

7. A canopy or panel locking assembly according to claim 1, wherein said locking means include a plurality of movable hook and/or bolt means associated with said canopy or panel element and engagable with respective complementary means associated with said apertures.

8. A drive assembly comprising:
a shaft member,
a sleeve member,
a coupling arrangement connecting said sleeve member to said shaft member,
a motor drivably connected to one of said shaft members and said sleeve member for routine rotation thereof, and
linear actuator means drivably connected to the other of said shaft member and said sleeve member for effecting emergency rotation thereof.

9. A drive assembly according to claim 8, which includes locking means for locking said shaft member, and means associated with said motor for causing unlocking of said locking means on actuation of said motor.

10. A drive assembly according to claim 9, wherein said sleeve member includes means operable to cause unlocking of said locking means on rotation thereof.

11. A drive assembly according to claim 8, which includes a clutch arrangement in the drive between said motor and said shaft member, said sleeve member including means operable on rotation thereof for releasing said clutch arrangement to allow relative movement between said motor and said shaft member.

* * * * *